United States Patent [19]
Childree

[11] Patent Number: 5,605,349
[45] Date of Patent: Feb. 25, 1997

[54] INTEGRATED CANISTER FOR AN AIRBAG INFLATOR

[75] Inventor: David Childree, Livermore, Calif.

[73] Assignee: Kaiser Aluminum & Chemical Corporation, Pleasanton, Calif.

[21] Appl. No.: 576,766

[22] Filed: Dec. 21, 1995

[51] Int. Cl.$^6$ ..................... B60R 21/26
[52] U.S. Cl. ............. 280/741; 280/736; 280/740; 222/3
[58] Field of Search ............... 280/741, 736, 280/740; 222/3; 102/530, 202.14; 422/164

[56] References Cited

U.S. PATENT DOCUMENTS

| | | | |
|---|---|---|---|
| 3,966,225 | 6/1976 | Marlow | 280/737 |
| 3,968,980 | 7/1976 | Hay | 280/734 |
| 4,018,457 | 4/1977 | Marlow | 280/735 |
| 5,195,777 | 3/1993 | Cuellas | 380/736 |
| 5,411,290 | 5/1995 | Chan et al. | 280/741 X |
| 5,482,315 | 1/1996 | Chandler, Jr. et al. | 283/741 |
| 5,536,040 | 7/1996 | Cuellas et al. | 280/737 |
| 5,542,702 | 8/1996 | Green et al. | 280/741 X |

FOREIGN PATENT DOCUMENTS 2270742 3/1994 United Kingdom .

Primary Examiner—Christopher P. Ellis
Attorney, Agent, or Firm—Lee & Hayes, PLLC

[57] ABSTRACT

A canister for an airbag inflator includes a tubular body having a cylindrical shape elongated from a first end to a second end along a longitudinal central The tubular body forms a continuous wall that defines a pressurized gas chamber at the first end and a diffuser at the second end. The continuous wall is spaced from the central axis by an approximately constant radial distance from the first end to the second end. The canister also includes a burst disk integrally formed with the body from a single piece of material (e.g., aluminum alloy). The burst disk is oriented transverse to the central axis to separate the pressurized gas chamber from the diffuser. The burst disk has a thickness less than that of the body wall. Because the burst disk and wall are formed of the same material according to these relative thicknesses, the burst disk will rupture before the structural integrity of the wall is compromised. A score pattern can be imprinted on the burst disk to facilitate uniform failure during activation of the inflator.

20 Claims, 4 Drawing Sheets

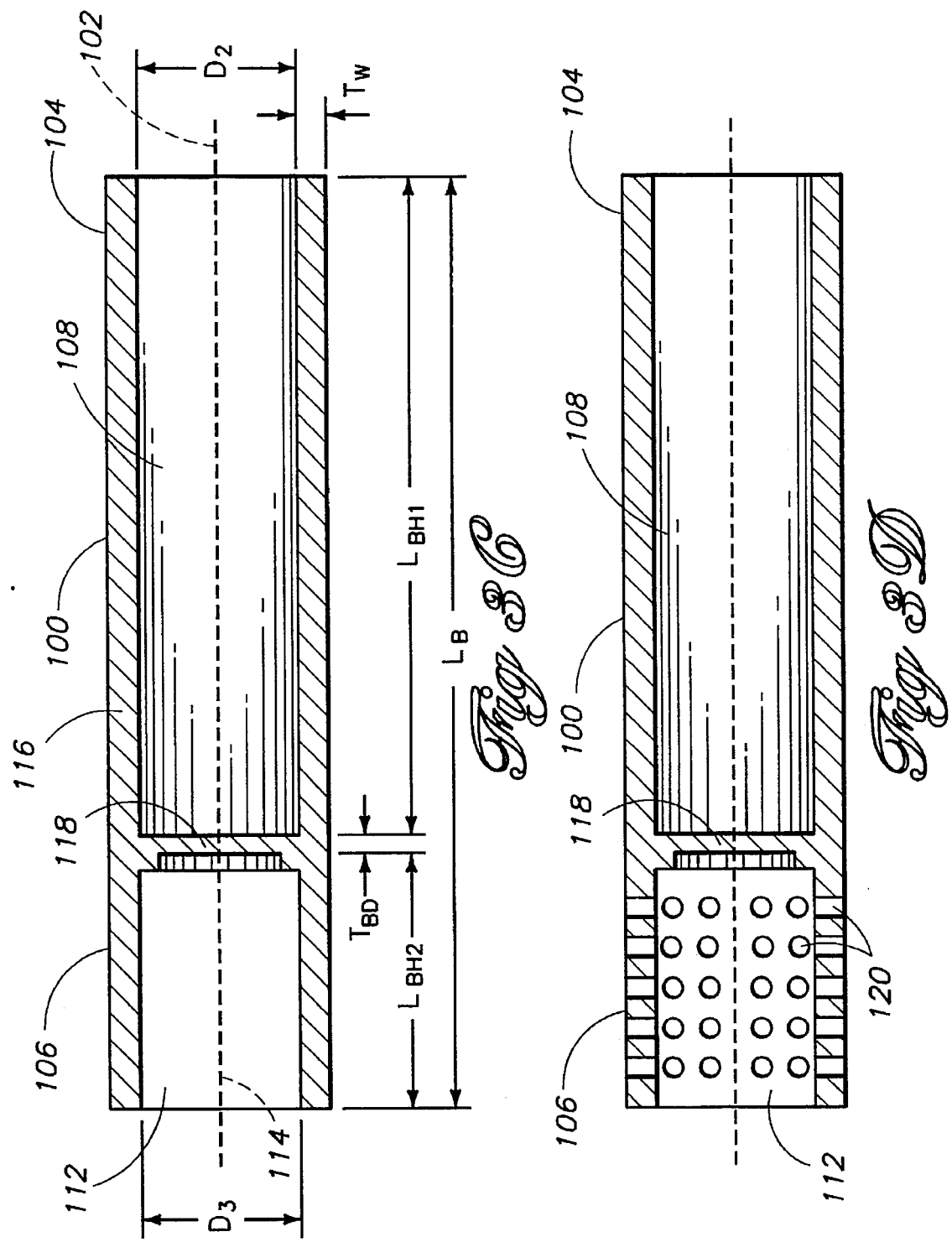

INTEGRATED CANISTER FOR AN AIRBAG INFLATOR

TECHNICAL FIELD

This invention relates to airbag inflators, and more particularly, to canisters used in airbag inflators. This invention also relates to methods for manufacturing the canisters.

BACKGROUND OF THE INVENTION

Vehicle airbag restraint systems are widely used to prevent or reduce injury to occupants involved in vehicle collisions. An airbag restraint system consists of a collision sensing device, an inflatable bag, and an inflator. The inflatable bag and inflator are commonly housed in a steering wheel or dashboard in front of the occupants. Upon collision, the collision sensing device outputs a signal to activate the inflator. Gases are rapidly released from the inflator to fill the bag, causing the bag to burst from the steering wheel dashboard container into a fully inflated restraining cushion. The process is nearly instantaneous as the bag is inflated during the brief time period following collision but before the occupant is propelled forward into the steering wheel or dashboard during a crash.

In recent vehicle models, airbag restraint systems are standard equipment. They typically include both driver-side airbags and passenger-side airbags. In some vehicles, such as minivans, the airbag restraint systems also include side airbags to protect passengers, such as children, from broadside collisions.

This invention concerns the inflator portion of the airbag restraint system. The inflator includes a canister, a pressurized gas, and an initiator. The canister defines a pressurized gas chamber and a diffuser. The gas chamber stores a liquefied gas or gas (e.g., nitrogen, argon, oxygen) under pressure. A burst disk separates the gas chamber from the diffuser. The initiator is mounted within the canister and electrically activated upon receipt of the signal from the collision sensing device. The initiator begins the inflation process which entails rupturing the burst disk to release the pressurized gas from the chamber, out through the diffuser, and into the bag.

This invention is more specifically directed to the canister. A conventional canister comprises a multi-piece assembly having a separate gas chamber, a separate diffuser that is welded or secured to the gas chamber, and various end pieces and caps. The burst disk is often another separate piece welded or sealed between the chamber and diffuser. Each of these pieces are typically formed of different materials. For instance, an inflator manufactured by Morton International employs a low carbon steel for the canister body, and a nickel-based alloy (e.g., Iconel™) for the burst disk. Other examples of multi-piece canisters can be found in UK Patent Application GB 2,270,742A to Blumenthal and U.S. Pat. No. 3,968,980 to Hay.

Multi-piece canisters have drawbacks. Each component and piece requires separate manufacturing, resulting in higher costs of materials and manufacturing. Additionally, the multi-piece assemblies typically require multiple welds which results in longer assembly time and expense. Also, multiple welding steps typically result in higher assembly scrap rates.

U.S. Pat. Nos. 3,966,225 and 4,018,457, both to Marlow, show inflators that employ an integrated canister in which the gas chamber is integrally formed with the diffuser. However, the canister described in these patents has a special structural design that is not conducive to easy and mass manufacturing practices. The gas chamber portion of the canister is a bottle-like shape with a wide diameter body tapering to a narrow diameter neck. The tapered neck acts as a mount for a propellant storage means. The diffuser portion of the canister is a small diameter extension which projects from the wide diameter body in an opposite direction from the tapered neck portion of the gas chamber.

As a result of this particular shape, the Marlow canister is difficult to manufacture. Several steps are required to form the bottle-like gas housing component and the small diffuser.

Accordingly, there is a need for an improved integrated canister that is both inexpensive and easy to manufacture.

SUMMARY OF THE INVENTION

This invention provides an integrated canister that requires few manufacturing steps and is inexpensive to produce.

According to one aspect of this invention, a canister for an airbag inflator includes a tubular body having a cylindrical shape elongated from a first end to a second end along a longitudinal central axis. The tubular body forms a continuous wall that defines a pressurized gas chamber at the first end and a diffuser at the second end. The continuous wall is spaced from the central axis by an approximately constant radial distance from the first end to the second end.

The canister also includes a burst disk integrally formed with the body from a single piece of material. In one implementation, the material is an aluminum alloy. The burst disk is oriented transverse to the central axis to separate the pressurized gas chamber from the diffuser. The wall has a thickness greater than that of the burst disk. The a ratio of the wall thickness relative to the burst disk thickness is dependent upon the material used to form the canister and the internal pressures of the gas chamber. Because the burst disk and wall are formed of the same material according to these relative thicknesses, the burst disk will fail before the structural integrity of the wall is compromised. A score pattern can be imprinted on the burst disk to facilitate uniform failure during activation.

According to other aspects of this invention, methods for manufacturing a canister for an airbag inflator are described. In the preferred implementation, the method includes extruding a piece of material using a forward-backward extrusion into a cylindrical-shaped body that is elongated along a longitudinal central axis. The forward-backward extrusion step creates a first cavity in the first end of the body that extends toward the second end, a second cavity in the second end of the body that extends toward the first end, and a burst disk intermediate of the first and second cavities. Next, the first or second cavity, or both, are machined to define a desired thickness of the burst disk and to true an outer wall thickness to be approximately constant thickness from the first end to the second end.

According to another implementation, the method includes forming a piece of material into a cylindrical-shaped body having a solid core. The body is elongated along a longitudinal central axis and has a length between a first end and a second end. A first cavity is bored in the first end of the body along a bore axis that is substantially parallel with the longitudinal central axis. The first cavity extends toward the second end to a depth that is a fraction of the body length. A second cavity is bored in the second end of the body along a bore axis that is substantially parallel with the central axis. The second cavity extends toward the first end to a depth that is a fraction of the body length. The boring steps yield first and second cavities of a combined depth that is less than the overall body length to thereby leave a remaining portion of the core between the first and second cavities. This remaining portion of the core defines the burst disk.

BRIEF DESCRIPTION OF THE DRAWINGS

FIGS. 3A–3D are longitudinal cross-sectional views showing evolution of the canister at various steps in methods for manufacturing the canister according to still another aspect of this invention.

DETAILED DESCRIPTION OF THE PREFERRED EMBODIMENT

Figure 1:
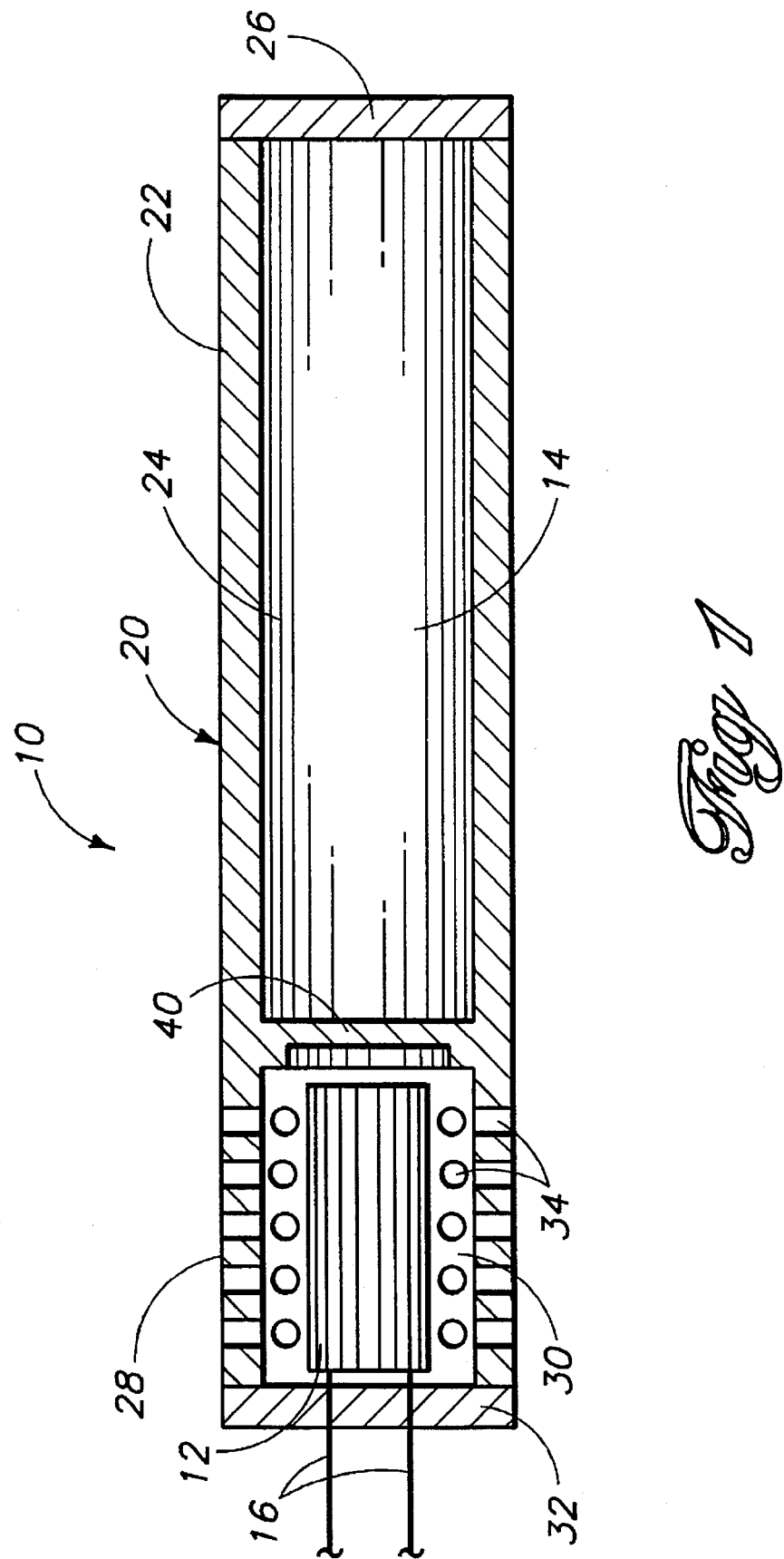
FIG. 1 is a partial longitudinal cross-sectional view and partial diagrammatic illustration of an airbag inflator according to one aspect of this invention.

FIG. 1 shows an airbag inflator 10 that is used in a vehicle airbag restraint system. Airbag inflator 10 has an initiator 12 and a fluid or mixture 14 housed within a canister 20.

The canister 20 has a first end 22 that defines a pressurized gas chamber 24. An end cap 26 is welded or threadably coupled to the first end 22 to enclose and hermetically seal the gas chamber 24. The canister 20 also has a second end 28 that defines a diffuser 30. Another end cap 32 is welded or threadably coupled to the second end 28 to enclose the diffuser 30. Multiple apertures or holes 34 are formed in the diffuser 30 to evacuate gas released from the gas chamber into the airbag (not shown) when the inflator is activated.

The canister 20 further includes a burst disk 40 intermediate of the first end 22 and the second end 28 to separate the gas chamber 24 from the diffuser 30. The burst disk 40 is ruptured during activation of the inflator to release the gas.

The fluid 14 is contained under pressure within the gas chamber 24 of canister 20. Typical operating pressures range from about 2000 psi to 4000 psi, with an example nominal fill pressure being approximately 3000 psi. Example fluids include nitrogen, argon, helium, oxygen, and mixtures thereof.

The initiator 12 is electrically coupled via conductors or wires 16 to a collision sensing device (not shown). Upon collision, an electrical signal is transmitted over wires 16 to the initiator 12 to activate the airbag inflation process. The initiator 12 can be implemented in several different ways, all of which are standard and well known. For instance, the initiator might be implemented as a dischargable cartridge whereby a projectile or rod is fired to penetrate and rupture the burst disk 40 to release the pressurized gas. A cartridge-type initiator is mounted in the diffuser 30 external to the gas chamber 24, as is shown in FIG. 1. Examples of a cartridge-type initiator is found in U.S. Pat. Nos. 3,966,225 and 4,018,457, both to Marlow, which are hereby incorporated by reference.

Alternatively, the initiator 12 might be in the form of an igniter which is positioned within the gas chamber 24 to induce a combustion process therein. This process generates heat and gaseous products which increase the pressure in the gas chamber 24. When the pressure reaches a threshold level, the burst disk ruptures, dispersing the gas out through the diffuser and into the bag. The igniter can be a spark plug, flash bulb igniter, or pyrotechnic igniter. An example of an igniter-type initiator is found in the published UK Patent Application GB 2,270,742, to Blumenthal, which is hereby incorporated by reference.

Figure 2:
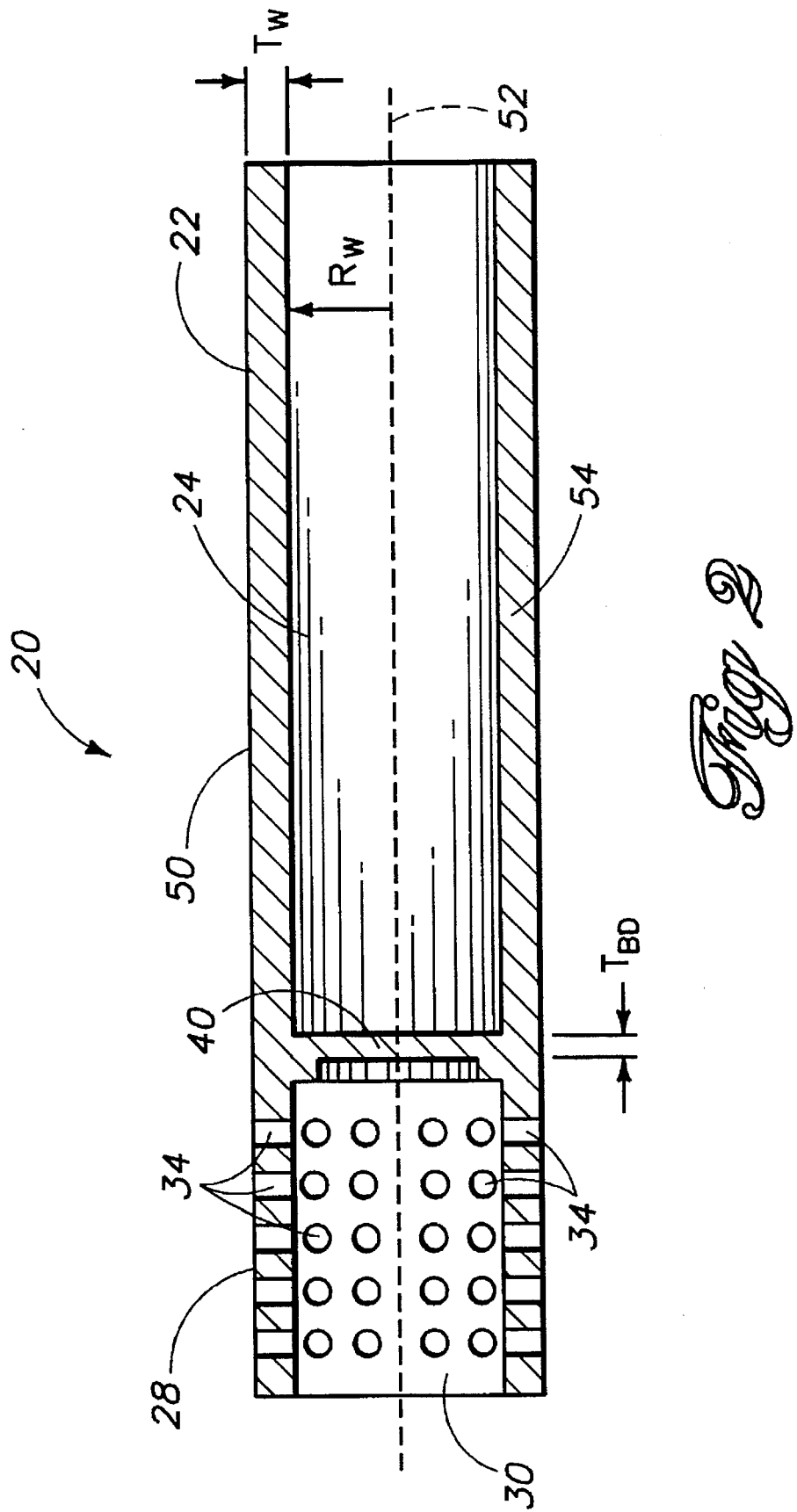
FIG. 2 is a longitudinal cross-sectional view of a canister according to another aspect of this invention.

FIG. 2 shows canister 20 in more detail and without end caps 26 and 32. Canister 20 has a hollowed tubular body 50 with a cylindrical shape. The body 50 is elongated from the first end 22 to the second end 28 along a longitudinal central axis 52. The tubular body 50 forms a continuous wall 54 extending between the two ends. The wall 54 defines the pressurized gas chamber 24 at the first end 22 and the diffuser 30 at the second end 28. The continuous wall is spaced from the central axis 52 by an approximately constant radial distance $R_W$ from the first end to the second end. In the illustrated implementation, the continuous wall 54 also has approximate uniform thickness $T_W$ from end to end.

The burst disk 40 is integrally formed with the body 50 from a single piece of material. Preferably, the material is an aluminum alloy because it is strong, lightweight, and conducive to the manufacturing steps described below with reference to FIGS. 3A–3D. However, other materials may be used, such as steel.

The burst disk 40 is oriented transverse to the central axis 52 to separate the pressurized gas chamber from the diffuser. In the illustrated embodiment, the burst disk 40 is approximately perpendicular to the central axis 52. The burst disk 40 has a thickness $T_{BD}$ that is less than the wall thickness $T_W$. As one example implementation, at a nominal pressurized chamber of 4000 psi, the ratio of wall thickness $T_W$ relative to burst disk thickness $T_{BD}$ is approximately 2½:1. In general, the ratio of wall thickness $T_W$ relative to burst disk thickness $T_{BD}$ is dependent upon the type of material used to form the canister and the internal pressures employed in the gas chamber. In an alternative construction, the center of the burst disk can be made with greater thickness (e.g., a thickness equal to the outer ridge at the periphery of the burst disk) to improve stiffness in the burst disk. This alternative construction would thus resemble a relatively thick burst disk with an annular groove formed therein, whereby the annular groove causes a wall thickness at that groove of a desired thickness $T_{BD}$.

Because the burst disk and wall are formed of the same material, and the wall thickness is relatively thicker than the burst disk thickness, the thinner burst disk will fail before the structural integrity of the wall is compromised when the inflator is activated. This uniformity enables the canister to be scalable to different sizes, depending upon the preferences of the design engineers. For instance, the wall/burst disk relative thicknesses can be gaged down for some inflators, giving airbag design engineers more internal volume to work with and reducing the overall weight.

To assist in generating a uniform breakage in the disk, a score pattern can be imprinted on one of the surfaces of the burst disk 40. Preferably, the score pattern is imprinted on the surface facing the initiator. Example score patterns include a horse-shoe design that yields a hinged tab upon rupture (similar to aluminum beverage cans) and a radial star or peddle pattern where peddles are curled back during rupture.

One or more apertures 34 are formed in the diffuser 30 at the second end 28 of the body. The size and number of apertures 34 are coordinated with the size of the burst disk opening so that the total area of apertures 34 is greater than or equal to the area of the burst disk opening. In this manner, the gas exiting under pressure from the gas chamber can be immediately diffused out through the apertures without the diffuser impeding the gas flow.

FIGS. 3A–3D show the canister at various stages of its manufacture during a method for making the canister according to an aspect of this invention. Two methods for making the canister are explained in relation to FIGS. 3A–3D, with a first, less preferred implementation being described first with respect to all four figures, and a second, more preferred implementation being described subsequently with respect to FIGS. 3D and 3C.

Figures 3A, 3B:
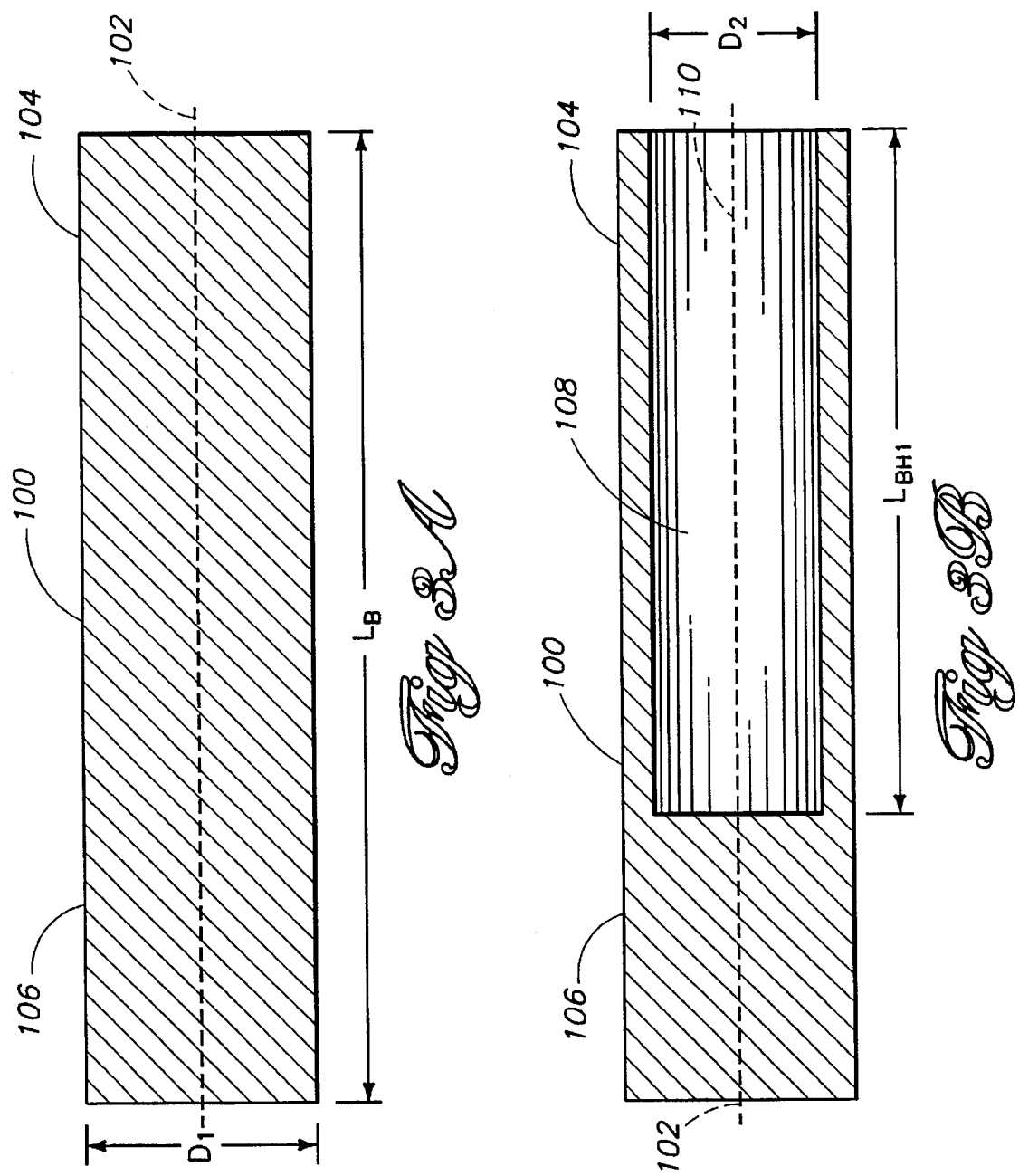

In FIG. 3A, a piece of material (e.g., aluminum alloy) is formed into a cylindrical-shaped body 100. The body 100 has a solid core and is elongated along a longitudinal central axis 102 between a first end 104 and a second end 106. The body has a length $L_B$ and a diameter $D_1$. As an example, a piece of aluminum is machined to the solid rod-like body 100 of diameter $D_1$ with a smooth external surface and flat ends, and then cut to the desired length $L_B$.

In FIG. 3B, a first cavity 108 is bored in the first end 104 of body 100 along a first bore axis 110 that is substantially parallel with the longitudinal central axis 102. In the illustrated embodiment, the bore axis 110 is coincident with the central axis 102. The first cavity 108 has a diameter $D_2$ and extends toward the second end 106 to a depth $L_{BH1}$ that is a fraction of the body length $L_B$. The first cavity 108 defines the pressurized gas chamber of the inflator.

In FIG. 3C, a second cavity 112 is bored in the second end 106 of body 100 along a second bore axis 114 that is substantially parallel with the longitudinal central axis 102. Again, in the illustrated embodiment, the second bore axis 114 is coincident with the central axis 102. The second cavity 112 has a diameter $D_3$ and extends toward the first end 104 to a depth $L_{BH2}$ that is a fraction of the body length $L_B$. The second cavity 112 defines the diffuser portion of the inflator.

In the example implementation, the boring steps produce cavities of diameters D2 and D3 which are approximately equal and less than the diameter D1 of the body 100. The bore cavities are sized to provide a continuous wall 116 from the first end 104 to the second end 106 which has an approximately constant wall thickness $T_W$. The first and second cavities 108 and 112 have a combined depth (i.e., $L_{BH1}$ and $L_{BH2}$) that is less than the body length $L_B$. In this manner, the steps of boring the solid core leaves a remaining portion of the core between the first and second cavities 108 and 112. That portion defines a burst disk 118 having a thickness $T_{BD}$ that is less than the wall thickness $T_W$.

Following the boring steps, a score pattern can be imprinted on the burst disk 118. Preferably, the score pattern is imprinted on the side that will eventually face the initiator when assembled.

In FIG. 3D, a plurality of apertures 120 are formed through the body wall at the second end 106 and into second cavity 112. These apertures can be formed by drilling, punching, or other known procedures.

This first method is described according to one example sequence of steps. It is noted that the method can be modified to perform steps in different sequences. For example, the diffuser cavity 112 can be bored before the gas chamber cavity 114 is bored. Moreover, the holes 120 could be formed after the diffuser cavity 112 is bored and before the gas chamber cavity 114 is bored.

In the more preferred implementation, the second method involves extruding a piece of material (e.g., aluminum alloy) using a forward-backward extrusion into a cylindrical-shaped body 100 that is elongated along a longitudinal central axis 102. As shown in FIG. 3C, the forward-backward extrusion simultaneously creates a first cavity 108 in the first end 104 of the body 100 that extends toward the second end 106 and a second cavity 112 in the second end 106 of the body 100 that extends toward the first end 104. The forward-backward extrusion leaves a burst disk 118 intermediate of the first and second cavities. Thereafter, the cavities are further machined along the axis 114 to define the desired wall thickness $T_W$ that is approximately constant thickness from the first end 104 to the second end 106. The machining further defines the desired thickness $T_{BD}$ of the burst disk 118. As an alternative, the burst disk 118 can be coined to its final thickness $T_{BD}$. Coining is a forging operation used for small metal movement. If conducted properly, coining enables a more precise and careful control of the final burst disk thickness than a machining operation.

As shown in FIG. 3D, the apertures 120 are formed through the body wall at the second end 106 and into the second cavity 112.

This method is advantageous as it requires few manufacturing steps, thereby reducing the expense to produce airbag canisters. The method also streamlines production of canisters as the boring process can be performed fairly quickly; there is no need for casts and the like to form bottle-like walls or other complex designs. Moreover, the forward-backward extrusion is advantageous in that it orients grain flow of the aluminum alloy (or other material) in an optimum direction.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. A canister for an airbag inflator comprising:

a tubular body having a cylindrical shape elongated from a first end to a second end along a longitudinal central axis, the tubular body forming a continuous wall that defines a pressurized gas chamber at the first end and a diffuser at the second end, the continuous wall being spaced from the central axis by an approximately constant radial distance from the first end to the second end; and a burst disk integrally formed with the body wherein the body and disk are formed together from a single piece of material, the burst disk being oriented transverse to the central axis to separate the pressurized gas chamber from the diffuser.

2. A canister as recited in claim 1 wherein the single piece of material comprises an aluminum alloy.

3. A canister as recited in claim 1 wherein the continuous wall has approximately uniform thickness from the first end to the second end.

4. A canister as recited in claim 1 wherein the wall has a thickness that is greater than a thickness of the burst disk.

5. A canister as recited in claim 1 wherein the burst disk is approximately perpendicular to the central axis.

6. A canister as recited in claim 1 further comprising a score pattern imprinted on the burst disk.

7. A canister as recited in claim 1 further comprising at least one aperture formed in the wall at the second end.

8. An airbag inflator incorporating a canister as recited in claim 1.

9. A method for manufacturing a canister for an airbag inflator, the method comprising the following step:

extruding a piece of material using a forward-backward extrusion into a cylindrical-shaped body that is elongated along a longitudinal central axis, the forward-backward extrusion creating a first cavity in the first end of the body that extends toward the second end, a second cavity in the second end of the body that extends toward the first end, and a burst disk intermediate of the first and second cavities.

10. A method as recited in claim 9 wherein the extruding step comprises extruding a cylindrical-shaped body from an aluminum alloy.

11. A method as recited in claim 9 further comprising an additional step of machining at least one of the first or second cavities along a bore axis that is substantially parallel with the longitudinal central axis to define a desired thickness of the burst disk.

12. A method as recited in claim 9 further comprising an additional step of coining the burst disk to a desired thickness.

13. A method as recited in claim 9 further comprising an additional step of machining at least one of the first or second cavity along a bore axis that is substantially parallel with the longitudinal central axis to produce an outer wall of approximately constant thickness from the first end to the second end.

14. A method as recited in claim 9 further comprising imprinting a score pattern on the burst disk.

15. A method as recited in claim 9 further comprising forming at least one aperture radially through the body into the second cavity at the second end.

16. A method for manufacturing a canister for an airbag inflator, the method comprising the following steps:

forming a piece of material into a cylindrical-shaped body having a solid core, the body being elongated along a longitudinal central axis and having a length between a first end and a second end;

boring a first cavity in the first end of the body along a bore axis that is substantially parallel with the longitudinal central axis, the first cavity extending toward the second end to a depth that is a fraction of the body length;

boring a second cavity in the second end of the body along a bore axis that is substantially parallel with the central axis, the second cavity extending toward the first end to a depth that is a fraction of the body length; and said boring steps producing the first and second cavities of a combined depth that is less than the body length to leave a remaining portion of the core between the first and second cavities, said remaining portion of the core defining a burst disk.

17. A method as recited in claim 16 wherein the forming step comprises forming the cylindrical-shaped body from an aluminum alloy.

18. A method as recited in claim 16 wherein the boring steps produce first and second circular openings of approximately equal diameters.

19. A method as recited in claim 16 further comprising imprinting a score pattern on the remaining portion of the core.

20. A method as recited in claim 16 further comprising forming at least one aperture radially through the body into the second cavity at the second end.

* * * * *